(12) United States Patent
Drake et al.

(10) Patent No.: US 9,346,708 B2
(45) Date of Patent: May 24, 2016

(54) STRENGTHENED GLASS SUBSTRATES WITH GLASS FRITS AND METHODS FOR MAKING THE SAME

(75) Inventors: Melinda A. Drake, Corning, NY (US); Lisa A. Lamberson, Painted Post, NY (US); Robert M. Morena, Lindley, NY (US)

(73) Assignee: CORNING INCORPORATED, Corning, NY (US)

(*) Notice: Subject to any disclaimer, the term of this patent is extended or adjusted under 35 U.S.C. 154(b) by 0 days.

(21) Appl. No.: 13/464,493

(22) Filed: May 4, 2012

(65) Prior Publication Data

US 2013/0295353 A1 Nov. 7, 2013

(51) Int. Cl.
| | |
|---|---|
| *C03C 17/04* | (2006.01) |
| *C03C 3/19* | (2006.01) |
| *C03C 8/08* | (2006.01) |
| *C03C 3/17* | (2006.01) |
| *C03C 4/02* | (2006.01) |

(52) U.S. Cl.
CPC . *C03C 17/04* (2013.01); *C03C 3/17* (2013.01); *C03C 3/19* (2013.01); *C03C 4/02* (2013.01); *C03C 8/08* (2013.01); *Y10T 428/24942* (2015.01); *Y10T 428/315* (2015.01)

(58) Field of Classification Search
None
See application file for complete search history.

(56) References Cited

U.S. PATENT DOCUMENTS

| | | | |
|---|---|---|---|
| 4,080,695 A * | 3/1978 | Gallaro et al. | 445/40 |
| 5,250,321 A | 10/1993 | Andersson et al. | 427/282 |
| 6,624,104 B2 | 9/2003 | Sakoske et al. | |
| 6,733,850 B1 | 5/2004 | Domi et al. | 428/34 |
| 6,998,776 B2 | 2/2006 | Aitken et al. | |
| 7,407,423 B2 | 8/2008 | Aitken et al. | |
| 7,560,401 B2 | 7/2009 | Prunchak et al. | |
| 8,063,560 B2 | 11/2011 | Aitken et al. | |
| 2001/0049327 A1 * | 12/2001 | Hachitani | 501/69 |
| 2002/0116949 A1 * | 8/2002 | Furui et al. | 65/43 |

(Continued)

FOREIGN PATENT DOCUMENTS

GB 2079119 1/1982

OTHER PUBLICATIONS

Phandroid, "Samsung and Corning Team Up to Develop Lotus Glass", http://phandroid.com/2012/02/03/samsung-and-corning-team-up-to-develop-lotus-glass/, pp. 1-3, Feb. 2012.*

(Continued)

*Primary Examiner* — Lisa Herring
(74) *Attorney, Agent, or Firm* — Payal A. Patel (57) ABSTRACT

Strengthened glass substrates with glass fits and methods for forming the same are disclosed. According to one embodiment, a method for forming a glass frit on a glass substrate may include providing a glass substrate comprising a compressive stress layer extending from a surface of the glass substrate into a thickness of the glass substrate, the compressive stress having a depth of layer DOL and an initial compressive stress $CS_i$. A glass frit composition may be deposited on at least a portion of the surface of the glass substrate. Thereafter, the glass substrate and the glass frit composition are heated in a furnace to sinter the glass fit composition and bond the glass frit composition to the glass substrate, wherein, after heating, the glass substrate has a fired compressive stress $CS_f$ which is greater than or equal to $0.70*CS_i$.

17 Claims, 2 Drawing Sheets

(56) References Cited

U.S. PATENT DOCUMENTS

| | | | |
|---|---|---|---|
| 2006/0154799 A1 | 7/2006 | Rehorek et al. | |
| 2009/0011915 A1 | 1/2009 | Drake et al. | 501/15 |
| 2009/0069164 A1* | 3/2009 | Lamberson et al. | 501/15 |
| 2009/0130395 A1 | 5/2009 | Lyon et al. | 428/195.1 |
| 2009/0151854 A1 | 6/2009 | Cooper | 156/109 |
| 2009/0247385 A1* | 10/2009 | Ide | 501/18 |
| 2009/0297862 A1 | 12/2009 | Boek et al. | 428/428 |
| 2010/0009154 A1* | 1/2010 | Allan et al. | 428/220 |
| 2010/0095705 A1 | 4/2010 | Burkhalter et al. | 65/61 |
| 2010/0304513 A1* | 12/2010 | Nguyen et al. | 438/27 |
| 2011/0014475 A1* | 1/2011 | Murata | 428/410 |
| 2011/0091668 A1* | 4/2011 | Lamberson et al. | 428/34 |
| 2011/0183118 A1 | 7/2011 | Lamberson et al. | 428/157 |
| 2012/0210750 A1* | 8/2012 | Cooper et al. | 65/43 |
| 2012/0213951 A1* | 8/2012 | Dennis | 428/34 |

OTHER PUBLICATIONS

Bocko, "Glass substrates for AMLCD, OLED, and Emerging Display Platforms", Handbook of Visual Display Technologies, Springer-Verlag Berlin Heideberg, 2012, p. 611.*

International Search Report and Written Opinion, dated Jul. 30, 2013—PCT/US2013/039434.

* cited by examiner

STRENGTHENED GLASS SUBSTRATES WITH GLASS FRITS AND METHODS FOR MAKING THE SAME

BACKGROUND

1. Field

The present specification generally relates to strengthened glass substrates and, more specifically, to ion-exchange strengthened glass substrates with glass frits applied to at least a portion of the surface and methods for making the same.

2. Technical Background

Ion exchange strengthening is used to improve the mechanical resistance of glass in numerous applications ranging from hand-held consumer smart-phones and electronic tablets to automotive glazing. Ion exchange strengthening is of particular interest in automotive glazing. Conventional automotive glazing is typically formed from soda-lime silica glass that has been thermally tempered to induce a surface compressive stress and improve the resistance of the glazing to mechanical failure following damage such as scratches, chips or the like. However, the amount of residual compressive stress imparted by thermal tempering is not high (on the order of 200 MPa-300 MPa). Accordingly, automotive glazing needs to be relatively thick to assure that the glazing will withstand high mechanical loads before failure occurs.

Ion exchange processes generally impart a greater amount of compressive stress (typically on the order of 600 MPa to 800 MPa) to glass articles compared to thermal tempering processes. Accordingly, ion exchanged glass articles generally have a greater resistance to mechanical failure than similar glass articles which are thermally tempered. This means that the ion exchanged glass articles may be formed with a reduced thickness while still retaining the same or even improved resistance to mechanical failure relative to thermally tempered glass articles.

However, in the case of automotive glazing, the compressive stress introduced by ion exchange may be diminished during subsequent processing steps, such as the application of glass frit to the surface of the automotive glazing, thereby mitigating the benefits of ion exchange strengthening.

Accordingly, a need exists for alternative strengthened glass substrates with glass fits which retain the benefits of ion exchange strengthening.

SUMMARY

According to one embodiment, a method for forming a glass fit on a glass substrate may include providing a glass substrate comprising a compressive stress layer extending from a surface of the glass substrate into a thickness of the glass substrate, the compressive stress having a depth of layer DOL and an initial compressive stress $CS_i$. A glass frit composition may be deposited on at least a portion of the surface of the glass substrate. Thereafter, the glass substrate and the glass frit composition are heated in a furnace to sinter the glass frit composition and bond the glass frit composition to the glass substrate. After heating, the glass frit composition is fully vitrified and the glass substrate has a fired compressive stress $CS_f$ which is greater than or equal to $0.70*CS_i$.

In another embodiment, a method for forming a glass frit on a glass substrate may include providing a glass substrate comprising a compressive stress layer extending from a surface of the glass substrate into a thickness of the glass substrate. The compressive stress may have a depth of layer DOL and an initial compressive stress $CS_i$. A glass frit composition may be deposited on at least a portion of the surface of the glass substrate. The glass frit composition may have a softening point which is less than or equal to 400° C. Thereafter, the glass substrate and the glass frit composition may be heated in a furnace to a temperature less than or equal to 450° C. such that, after heating, the glass frit composition is fully vitrified, sintered, and bonded to the glass substrate.

In yet another embodiment, a glass substrate may include a compressive stress layer extending from a surface of the glass substrate into a thickness of the glass substrate. The compressive stress may have a depth of layer DOL and a fired compressive stress $CS_f$. A glass frit may be fully vitrified and bonded to at least a portion of the surface of the glass substrate. The glass frit may have a softening point of less than or equal to 400° C., a glass transition temperature which is less than or equal to 375° C., and a sintering temperature of less than 450° C. The fired compressive stress $CS_f$ of the glass substrate may be greater than or equal to 0.70 of an initial compressive stress $CS_i$ of the glass substrate prior to the glass frit being bonded to at least a portion of the glass substrate.

Additional features and advantages of the strengthened glass substrates with glass frits will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
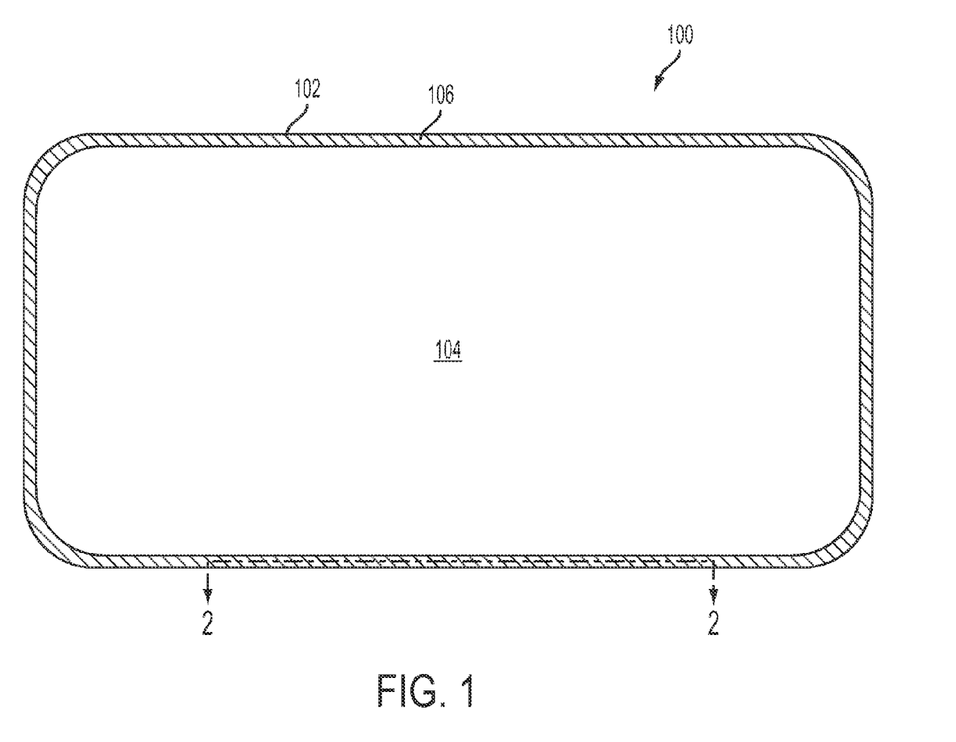
FIG. 1 schematically depicts a strengthened glass substrate with a glass frit applied to the perimeter of the glass substrate according to one or more embodiments shown and described herein.

Reference will now be made in detail to embodiments of the strengthened glass substrates with glass frits and methods for making the same, examples of which are illustrated in the accompanying drawings. Whenever possible, the same reference numerals will be used throughout the drawings to refer to the same or like parts. One embodiment of a strengthened glass substrate with a glass frit is schematically depicted in FIG. 1. In one embodiment, the method for forming the glass frit on the glass substrate may include providing a glass substrate comprising a compressive stress layer extending from a surface of the glass substrate into a thickness of the glass substrate. The compressive stress may have a depth of layer DOL and an initial compressive stress $CS_i$. A glass frit composition may be deposited on at least a portion of the surface of the glass substrate. Thereafter, the glass substrate and the glass frit composition are heated in a furnace to fully vitrify and sinter the glass frit composition and bond the glass frit composition to the glass substrate. After heating, the glass substrate has a fired compressive stress $CS_f$ which is greater than or equal to $0.70*CS_i$. Methods for forming the glass frit on the strengthened glass substrate and strengthened glass substrates with glass frits will be described in more detail herein with specific reference to the appended drawings.

The term "CTE," as used herein, refers to the average coefficient of thermal expansion of the specified component (i.e., the glass substrate or the glass frit) in a temperature range from 0° C. to 300° C.

The phrase "softening point," as used herein, refers to the temperature at which the glass frit composition has a viscosity of $1 \times 10^{7.6}$ kp.

The phrase "glass transition temperature," as used herein, refers to the temperature at which the glass frit composition transitions from a liquid to a solid as the liquid is cooled.

In the embodiments of the glass frit compositions described herein, the concentration of constituent components (e.g., SnO, $P_2O_5$, $V_2O_5$, and the like) are specified in mole percent (mol. %) on an oxide basis, unless otherwise specified.

The phrase "substantially free," as used herein, refers to the concentration of the identified component being present in a composition in a trace amount of less than or equal to about 1 mol. %.

Glass substrates, such as automotive glazing and cover glasses for electronic devices, may include a glass frit applied to one or more surfaces of the glass substrate. The glass frit may be used to conceal various electrical components that are attached to the glass substrate or which may otherwise be visible through the glass substrate. The glass frit is usually applied to the glass substrate in a paste form and subsequently fired to sinter the glass fit and to bond the glass frit to the glass substrate. Conventional glass frits for such applications generally have relatively high softening points and glass transition temperatures and, as such, require relatively high firing temperatures (600° C. to 700° C.).

It is also desirable to chemically strengthen glass substrates by ion exchange to improve the mechanical strength and durability of the glass substrates. However, when the glass frit is applied to the strengthened glass substrates and the glass substrates are fired to sinter and bond the glass frit, the relatively high firing temperatures of conventional glass frits (i.e., in the range of 600° C. to 700° C.) cause the compressive stress in the strengthened glass substrates to diminish, reducing or eliminating any strength benefit obtained through the ion exchange process.

The glass substrates with glass frits and methods for forming the same described herein mitigate the loss of compressive stress in the glass substrate.

Figure 2:
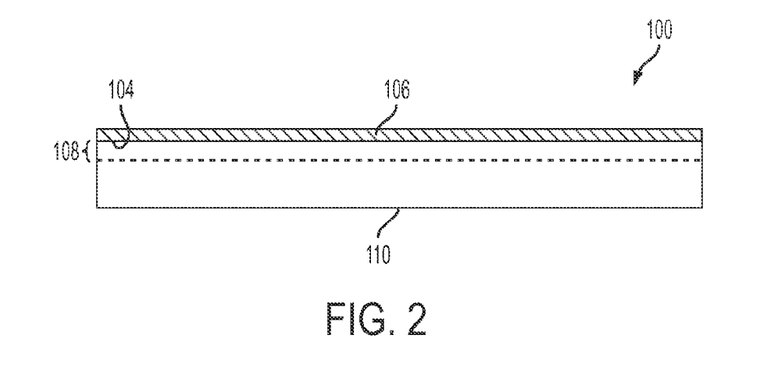
FIG. 2 schematically depicts a partial cross section of the strengthened glass substrate of FIG. 1.

Referring now to FIGS. 1 and 2, one embodiment of a strengthened glass substrate 100 with a glass frit 106 is schematically depicted. The glass substrate generally has a first surface 104, a second surface 110 opposite the first surface 104, and a perimeter edge 102. In the embodiment of the glass substrate 100 depicted in FIG. 1, the glass frit 106 is positioned on the first surface 104 of the glass substrate directly adjacent to the perimeter edge 102 of the glass substrate 100.

In the embodiments described herein, the glass substrate 100 may be used as a cover glass for electronic devices, such as tablet computers, smart phones, automated teller machines or the like. Alternatively, the glass substrate 100 may be used for automotive glazing. In this embodiment, glass fit 106 located about the perimeter of the glass substrate may be used to conceal components which are attached to one of the surfaces of the glass substrate, such as electrical leads, wires, antennas, or the like.

In the embodiments described herein, the glass substrate 100 is formed from ion exchangeable glass. In an exemplary embodiment, the glass substrate 100 may be formed from glass code 2318 alkali aluminosilicate glass manufactured by Corning, Inc. which is commercially available as Gorilla™ glass. However, it should be understood that the glass substrate 100 may be formed from other types of ion-exchangeable glass including, without limitation, alkali borosilicate glasses or the like.

In the embodiments described herein, the glass substrate 100 is ion exchange strengthened such that the glass substrate 100 has a layer of compressive stress which extends from the surfaces 104, 110 of the glass substrate into the thickness of the glass substrate 100. This layer of compressive stress extends from each surface 104, 110 to a depth of layer 108 (DOL). The depth of layer 108 from the first surface 104 is schematically depicted in FIG. 2. The glass substrate generally has an initial compressive stress $CS_i$ which is a maximum at the surface of the glass substrate prior to application and sintering of the glass frit 106. The compressive stress decreases with increasing distance into the thickness of the glass substrate 100.

In some embodiments described herein, the depth of layer DOL may be greater than or equal to about 30 μm or even greater than or equal to about 40 μm. In some other embodiments, the depth of layer may be greater than 50 μm. However, it should be understood that the glass substrate may have a depth of layer which is less than 30 μm.

In some embodiments described herein, the initial compressive stress $CS_i$ may be greater than or equal to 600 MPa or even greater than or equal to about 650 MPa. In some other embodiments, the initial compressive stress $CS_i$ may be greater than 700 MPa or even greater than 800 MPa. However, it should be understood that initial compressive stresses of less than 600 MPa are also contemplated.

The glass substrate generally has a coefficient of thermal expansion $CTE_S$. In general, the coefficient of thermal expansion $CTE_S$ of the glass substrate is closely matched to the coefficient of thermal expansion $CTE_F$ of the glass frit 106, as will be described in more detail herein. In some embodiments, the coefficient of thermal expansion $CTE_S$ of the glass substrate is greater than or equal to about $80 \times 10^{-7}$/° C. and less than or equal to $95 \times 10^{-7}$/° C. However, it should be understood that the coefficient of thermal expansion $CTE_S$ of the glass substrate may vary depending on the specific composition of the glass substrate.

The glass frit compositions from which the glass frit 106 is formed generally have sintering temperatures $T_s$ which are less than or equal to 450° C. In some embodiments, the sintering temperatures of the glass frit compositions are less than 425° C. or even less than 400° C. These relatively low sintering temperatures facilitate sintering the glass frit compositions and bonding the glass frit compositions to strengthened glass substrates, such as ion exchange strengthened glass substrates, without a significant reduction in the compressive stress of the glass substrate due to stress relaxation.

Specifically, the glass substrate to which the glass frit composition is applied may have an initial compressive stress $CS_i$ following ion exchange. After the glass frit composition is applied to the glass substrate and heated to the sintering temperature $T_s$ to facilitate fully vitrifying and sintering the glass frit composition and bonding the glass frit composition to the glass substrate, the glass substrate has a fired compressive stress $CS_f$ which is less than the initial compressive stress $CS_i$. In the embodiments described herein, the fired compressive stress $CS_f$ is generally greater than or equal to $0.70*CS_i$ (i.e., the fired compressive stress $CS_f$ is greater than or equal to 70% of the initial compressive stress). In some of these embodiments, the fired compressive stress may be greater than or equal to $0.75*CS_i$ or even $0.80*CS_i$. This minimum reduction in compressive stress is due to the relatively low firing temperatures needed to sinter the glass frit composition and bond the glass frit composition to the glass substrate.

The relatively low firing temperatures of the glass fit composition are achieved by utilizing glass frit compositions which generally have relatively low glass transition temperatures $T_g$ and relatively low softening points. Specifically, the glass frit compositions described herein generally have glass transition temperatures $T_g$ which are less than or equal to about 375° C. or even less than or equal to about 350° C. In some embodiments, the glass transition temperatures $T_g$ of the glass frit compositions are greater than or equal to about 300° C. and less than or equal to 375° C. In some embodiments, the glass transition temperatures $T_g$ of the glass fit compositions are greater than or equal to about 300° C. and less than or equal to 350° C. In some of these embodiments, the glass transition temperatures may be greater than or equal to about 300° C. and less than or equal to 325° C.

The glass fit compositions described herein also have relatively low softening points. Specifically, the glass frit compositions described herein generally have softening points which are less than or equal to 400° C. In some embodiments, the softening points of the glass frit compositions are greater than or equal to about 350° C. and less than or equal to 400° C. which generally correspond to the glass frit compositions having sintering temperatures in the range from about 400° C. to about 450° C. In some of these embodiments, the softening points of the glass frit compositions may be greater than or equal to about 350° C. and less than or equal to 375° C.

In order to further minimize the reduction of compressive stress in the strengthened glass substrate 100, the glass frit compositions have sintered coefficients of thermal expansion $CTE_F$ which closely match the coefficient of thermal expansion $CTE_S$ of the glass substrate when the glass frit composition is sintered and bonded to the glass substrate. Specifically, if the coefficient of thermal expansion $CTE_F$ of the glass frit is greater than the coefficient of thermal expansion $CTE_S$ of the glass substrate, the compressive stress in the surface of the glass substrate in areas where the glass frit is bonded to the glass substrate may be diminished or the surface of the glass substrate may even be in tension in localized areas. Accordingly, in the embodiments described herein, the sintered coefficient of thermal expansions $CTE_F$ of the glass frit composition is within $+/-10\times10^{-7}/°$ C. of the coefficient of thermal expansion $CTE_S$ of the glass substrate or even within $+/-5\times10^{-7}/°$ C. of the coefficient of thermal expansion $CTE_S$ of the glass substrate. In some of these embodiments, the sintered coefficient of thermal expansion $CTE_F$ of the glass fit compositions is within $+/-2.5\times10^{-7}/°$ C. the coefficient of thermal expansion $CTE_S$ of the glass substrate or even within $+/-0.5\times10^{-7}/°$ C. the coefficient of thermal expansion $CTE_S$ of the glass substrate.

In some embodiments, the glass frit composition may be substantially black in color upon sintering. Glass frit which sinters black is particularly suitable for use in automotive glazing applications where a black frit is generally desired. However, it should be understood that glass frit which sinters black may be used in other applications, including, without limitation, for cover panels for electronic devices. Further, while glass fit compositions which sinter black have been described herein as being suitable for specific applications, it should be understood that the glass frit composition may have other fired colors and that the color of the glass frit may be altered by adding certain colorants to the glass frit composition and/or to the glass batch from which the glass frit composition is formed.

In one exemplary embodiment, the glass frit is formed from a Sb—V-phosphate glass frit composition which includes $V_2O_5$, $P_2O_5$ and $Sb_2O_3$. In this exemplary embodiment, $V_2O_5$ is used to control the glass transition temperature of the glass frit composition. Specifically, increasing the concentration of $V_2O_5$ in the glass frit composition generally reduces the glass transition temperature of the glass frit composition. When the concentration of $V_2O_5$ in the glass fit composition is less than about 40 mol. %, the glass transition temperature of the glass frit composition is too high to achieve the desired relatively low sintering temperature of 450° C. However, if the concentration of $V_2O_5$ in the glass frit composition is too high, the aqueous durability of the glass frit composition is diminished. Accordingly, in the embodiments of the Sb—V-phosphate glass frit compositions described herein, $V_2O_5$ is present in the glass frit composition in a concentration greater than or equal to about 40 mol. % and less than or equal to about 60 mol. %. In some embodiments, the concentration of $V_2O_5$ may be greater than or equal to about 50 mol. % and less than or equal to about 60 mol. %.

Additions of $P_2O_5$ in the Sb—V-phosphate glass frit composition acts as a glass former and stabilizes the frit. When the concentration of $P_2O_5$ is the glass frit is less than about 15 mol. %, the glass frit composition crystallizes at low temperatures which is undesired. When the concentration of $P_2O_5$ is greater than about 30 mol. %, the glass transition temperature and the softening point of the glass fit become too high to achieve the desired relatively low sintering temperature of 450° C. Accordingly, in the embodiments of the Sb—V-phosphate glass frit compositions described herein, $P_2O_5$ is present in the glass frit composition in a concentration greater than equal to about 15 mol. % and less than or equal to about 30 mol. %. In some embodiments, the concentration of $P_2O_5$ may be greater than or equal to about 25 mol. % and less than or equal to about 30 mol. %. In some other embodiments, the concentration of $P_2O_5$ may be greater than or equal to about 23 mol. % and less than or equal to about 25 mol. %.

Additions of $Sb_2O_3$ in the Sb—V-phosphate glass frit compositions improve the aqueous durability of the glass frit composition. When the concentration of $Sb_2O_3$ in the glass frit is less than about 10 mol. %, the aqueous durability of the glass fit composition is diminished. When the concentration of $Sb_2O_3$ is greater than about 35 mol. %, the glass transition temperature of the glass fit become too high to achieve the desired relatively low sintering temperature of 450° C. Accordingly, in the embodiments of the Sb—V-phosphate glass frit compositions described herein, $Sb_2O_3$ is present in the glass frit composition in a concentration greater than or equal to about 10 mol. % and less than or equal to about 35 mol. %. In some embodiments, the concentration of $Sb_2O_3$ may be greater than or equal to about 10 mol. % and less than or equal to about 20 mol. %. In this embodiment, the glass frit composition exhibits good viscous flow and acceptable aqueous durability. In some other embodiments, the concentration of $Sb_2O_3$ may be greater than or equal to about 20 mol. % and less than or equal to about 35 mol. %. In some other embodiments, the concentration of $Sb_2O_3$ may be greater than or equal to about 23 mol. % and less than or equal to about 25 mol. %. In these embodiments, the frit composition exhibits excellent aqueous durability and acceptable viscous flow characteristics.

The exemplary Sb—V-phosphate glass frit compositions may optionally include additional constituent components such as $Al_2O_3$, $Fe_2O_3$, and $TiO_2$. For example, $Al_2O_3$ may be included in a concentration greater than or equal to about 0 mol. % and less than or equal to 2.0 mol. %. The presence of $Al_2O_3$ generally improves the aqueous durability of the glass frit composition. However, if the concentration of $Al_2O_3$ exceeds 2.0 mol. %, the aluminum in the glass frit composition may precipitate out which is undesirable.

$TiO_2$ may be included in the glass composition to improve the viscous flow of the glass frit composition. However, when the concentration of $TiO_2$ exceeds about 2 mol. % the aqueous durability of the glass frit composition may be decreased. Accordingly, in the exemplary Sb—V-phosphate glass frit compositions, the concentration of $TiO_2$, when included, may be greater than or equal to about 0 mol. % and less than or equal to about 2 mol. %.

$Fe_2O_3$ may be included in the glass composition to stabilize the oxidation state of the vanadium constituent components. In the embodiments in the exemplary Sb—V-phosphate glass frit compositions, the concentration of $Fe_2O_3$, when included, may be greater than or equal to about 0 mol. % and less than or equal to about 5 mol. % or even greater than or equal to about 0 mol. % and less than or equal to about 2.5 mol. %.

The exemplary Sb—V-phosphate glass frit compositions described herein generally have glass transition temperatures in the range from about 300° C. to about 350° C. These glass frit compositions have a sintering temperature from about 400° C. to about 425° C. Accordingly, the exemplary Sb—V-phosphate glass fit compositions may be fully vitrified, sintered and bonded to glass substrates at temperatures less than 450° C. Moreover, the Sb—V-phosphate glass frit compositions generally have a sintered coefficient of thermal expansion $CTE_F$ in the range from about $70 \times 10^{-7}/°$ C. to about $80 \times 10^{-7}/°$ C. and a softening point in the range from about 350° C. to about 400° C.

In one exemplary embodiment of the Sb—V-phosphate glass frit composition, the glass frit composition includes from about 40 mol. % to about 60 mol. % $V_2O_5$; from about 15 mol. % to about 30 mol. % $P_2O_5$; from about 20 mol. % to about 35 mol. % $Sb_2O_3$; from about 0 mol. % to about 2 mol. % $Al_2O_3$; from about 0 mol. % to about 5 mol. % $Fe_2O_3$; and from about 0 mol. % to about 2 mol. % $TiO_2$.

In another exemplary embodiment of the Sb—V-phosphate glass frit composition, the glass frit composition includes from about 50 mol. % to about 60 mol. % $V_2O_5$; from about 25 mol. % to about 30 mol. % $P_2O_5$; from about 10 mol. % to about 20 mol. % $Sb_2O_3$; from about 0 mol. % to about 2 mol. % $Al_2O_3$; from about 0 mol. % to about 2.5 mol. % $Fe_2O_3$; and from about 0 mol. % to about 2 mol. % $TiO_2$.

In another exemplary embodiment, the glass frit is formed from a V-phosphate glass frit composition which includes $V_2O_5$ and $P_2O_5$ but is free of antimony and compounds containing antimony. In this exemplary embodiment, $V_2O_5$ is used to control the glass transition temperature of the glass frit composition. Specifically, increasing the concentration of $V_2O_5$ in the glass frit composition generally reduces the glass transition temperature of the glass frit composition. When the concentration of $V_2O_5$ in the glass fit composition is less than about 30 mol. %, the glass frit composition exhibits poor viscous flow. However, if the concentration of $V_2O_5$ in the glass frit composition is greater than about 50 mol. %, the aqueous durability of the glass fit composition is diminished. Accordingly, in the embodiments of the V-phosphate glass frit compositions described herein, $V_2O_5$ is present in the glass frit composition in a concentration greater than or equal to about 30 mol. % and less than or equal to about 50 mol. %. In some embodiments, the concentration of $V_2O_5$ may be greater than or equal to about 35 mol. % and less than or equal to about 45 mol. %.

Additions of $P_2O_5$ in the V-phosphate glass frit composition acts as a glass former and stabilizes the frit. When the concentration of $P_2O_5$ is the glass frit is less than about 10 mol. %, the glass frit composition crystallizes at low temperatures which is undesired. When the concentration of $P_2O_5$ is greater than about 30 mol. %, the glass transition temperature and the softening point of the glass fit become too high to achieve the desired relatively low sintering temperature of 450° C. Accordingly, in the embodiments of the V-phosphate glass frit compositions described herein, $P_2O_5$ is present in the glass frit composition in a concentration greater than equal to about 10 mol. % and less than or equal to about 30 mol. %. In some embodiments, the concentration of $P_2O_5$ may be greater than or equal to about 15 mol. % and less than or equal to about 25 mol. %.

The V-phosphate glass fit compositions may also include additional constituent components such as $Fe_2O_3$, $TiO_2$, and ZnO. $TiO_2$ may be included in the glass composition to improve the viscous flow of the glass fit composition. However, when the concentration of $TiO_2$ exceeds about 30 mol. % the aqueous durability of the glass frit composition may be decreased. When the concentration of $TiO_2$ is less than about 10 mol. %, the viscous flow of the glass frit composition is poor. Accordingly, in the exemplary V-phosphate glass frit compositions, the concentration of $TiO_2$ is greater than or equal to about 10 mol. % and less than or equal to about 30 mol. %. In some embodiments, the concentration of $TiO_2$ is greater than or equal to about 12 mol. % and less than or equal to about 25 mol. %.

$Fe_2O_3$ may be included in the glass frit composition to stabilize the oxidation state of the vanadium constituent components. When the concentration of $Fe_2O_3$ is greater than about 30 mol. %, the glass transition temperature of the glass frit is too high. However, when the concentration of $Fe_2O_3$ is less than about 10 mol. %, the aqueous durability of the glass fit composition is low. Accordingly, in the embodiments in the exemplary V-phosphate glass frit compositions, the concentration of $Fe_2O_3$ may be greater than or equal to about 10 mol. % and less than or equal to about 30 mol. % or even greater than or equal to about 12 mol. % and less than or equal to about 25 mol. %.

ZnO may be added to the glass composition to improve the viscous flow of the glass frit composition. However, when the concentration of ZnO in the glass frit composition is greater than about 10 mol. %, the aqueous durability of the glass frit composition is low. In the exemplary V-phosphate glass frit compositions described herein, the concentration of ZnO may be greater than or equal to about 0 mol. % and less than or equal to about 10 mol. %. In some embodiments, the concentration of ZnO is greater than or equal to 3 mol. % and less than or equal to 7 mol. %.

The exemplary V-phosphate glass frit compositions described herein generally have glass transition temperatures in the range from about 350° C. to about 375° C. These glass frit compositions have a sintering temperature from about 425° C. to about 450° C. Accordingly, the exemplary V-phosphate glass frit compositions may be fully vitrified, sintered and bonded to glass substrates at temperatures less than 450° C. Moreover, the V-phosphate glass frit compositions generally have a sintered coefficient of thermal expansion $CTE_F$ in the range from about $50 \times 10^{-7}/°$ C. to about $70 \times 10^{-7}/°$ C. and a softening point in the range from about 350° C. to about 400° C.

In one exemplary embodiment of the V-phosphate glass frit composition, the glass fit composition includes from about 30 mol. % to about 50 mol. % $V_2O_5$; from about 10 mol. % to about 30 mol. % $P_2O_5$; from about 0 mol. % to about 10 mol. % ZnO; from about 10 mol. % to about 30 mol. % $Fe_2O_3$; and from about 10 mol. % to about 30 mol. % $TiO_2$. The V-phosphate glass frit composition is substantially free from antimony and compounds containing antimony.

In another exemplary embodiment of the V-phosphate glass frit composition, the glass frit composition includes about 40 mol. % $V_2O_5$; about 20 mol. % $P_2O_5$; about 5 mol. % ZnO; about 17.5 mol. % $Fe_2O_3$; and about 17.5 mol. % $TiO_2$. The V-phosphate glass fit composition is substantially free from antimony and compounds containing antimony.

In another exemplary embodiment, the glass frit may be formed from a Sn—Zn-phosphate glass frit composition which includes SnO, $P_2O_5$, ZnO and $B_2O_3$. In this exemplary embodiment, SnO is used to control the glass transition temperature of the glass frit composition. Specifically, increasing the concentration of SnO in the glass frit composition generally reduces the glass transition temperature of the glass frit composition. When the concentration of SnO in the glass frit composition is less than about 50 mol. %, the glass transition temperature of the glass frit composition is too high to achieve the desired relatively low sintering temperature of 450° C. However, if the concentration of SnO in the glass frit composition is greater than about 75 mol. %, the CTE of the glass frit composition is too high. Accordingly, in the embodiments of the Sn—Zn-phosphate glass frit compositions described herein, SnO is present in the glass frit composition in a concentration greater than or equal to about 50 mol. % and less than or equal to about 75 mol. %. In some embodiments, the concentration of SnO may be greater than or equal to about 50 mol. % and less than or equal to about 65 mol. %.

Additions of $P_2O_5$ in the Sn—Zn-phosphate glass frit composition act as a glass former and stabilize the frit. When the concentration of $P_2O_5$ is the glass frit is less than about 28 mol. %, the glass frit composition crystallizes at low temperatures which is undesired. When the concentration of $P_2O_5$ is greater than about 35 mol. %, the glass transition temperature and the softening point of the glass frit become too high to achieve the desired relatively low sintering temperature of 450° C. Accordingly, in the embodiments of the Sn—Zn-phosphate glass frit compositions described herein, $P_2O_5$ is present in the glass frit composition in a concentration greater than or equal to about 28 mol. % and less than or equal to about 35 mol. %. In some embodiments, the concentration of $P_2O_5$ may be greater than or equal to about 30 mol. % and less than or equal to about 33 mol. %.

Additions of ZnO in the Sn—Zn-phosphate glass frit composition aid in improving the aqueous durability of the glass frit composition. When the concentration of ZnO in the glass frit composition is greater than about 10 mol. %, the glass transition temperature and softening point of the glass frit become too high to achieve the desired relatively low sintering temperature of 450° C. However, when the concentration of ZnO in the glass fit composition is less than about 2 mol. %, the aqueous durability of the glass composition is diminished. Accordingly, in the embodiments of the Sn—Zn-phosphate glass fit compositions described herein, ZnO is present in the glass frit composition in a concentration greater than or equal to about 2 mol. % and less than or equal to about 10 mol. %. In some embodiments, the concentration of ZnO may be greater than or equal to about 3 mol. % and less than or equal to about 7 mol. %.

Additions of $B_2O_3$ in the Sn—Zn-phosphate glass frit composition form boron-phosphate groups which improve the aqueous durability of the glass composition. When the concentration of $B_2O_3$ in the glass frit composition is less than about 1 mol. % no improvement in the aqueous durability is realized. When the concentration of $B_2O_3$ is greater than about 5 mol. %, the glass transition temperature and softening point of the glass frit become too high to achieve the desired relatively low sintering temperature of 450° C. Accordingly, in the embodiments of the Sn—Zn-phosphate glass frit compositions described herein, $B_2O_3$ is present in the glass frit composition in a concentration greater than equal to about 1 mol. % and less than or equal to about 5 mol. %. In some embodiments, the concentration of $B_2O_3$ may be greater than or equal to about 2 mol. % and less than or equal to about 4.5 mol. %.

The exemplary Sn—Zn-phosphate glass frit compositions described herein generally have glass transition temperatures in the range from about 300° C. to about 350° C. These glass fit compositions have a sintering temperature from about 425° C. to about 450° C. Accordingly, the exemplary Sn—Zn-phosphate glass frit compositions may be fully vitrified, sintered and bonded to a glass substrate at temperatures less than 450° C. Moreover, the Sn—Zn-phosphate glass frit compositions generally have a sintered coefficient of thermal expansion $CTE_F$ in the range from about $90 \times 10^{-7}/°$ C. to about $110 \times 10^{-7}/°$ C. and a softening point from about 375° C. to about 425° C.

In one exemplary embodiment of the Sn—Zn-phosphate glass frit composition described herein, the glass frit composition includes from about 50 mol. % to about 75 mol. % SnO; from about 28 mol. % to about 35 mol. % $P_2O_5$; from about 2 mol. % to about 10 mol. % ZnO; and from about 1 mol. % to about 5 mol. % $B_2O_3$.

In the embodiments of the glass frit compositions described herein, the glass frit compositions are substantially free from lead.

Referring again to FIGS. 1 and 2, the glass frit is applied to the glass substrate by first mixing a batch of the glass frit constituent components and firing the batch under conditions sufficient to render the batch into glass. Thereafter, the glass formed from the glass frit composition is pulverized into powdered glass. The powdered glass is then mixed with rheological aids, such as Texanol™ ester alcohol or similar rheological aids, to form a plasticized frit composition in the form of a paste.

The paste is deposited on at least a portion of one or more surfaces of a glass substrate which has an initial compressive stress $CS_i$, as described above. For example, in the embodiment of the glass substrate depicted in FIG. 1, the paste is deposited as a bead directly adjacent to the perimeter edge 102 of the glass substrate 100. While FIG. 1 depicts the paste as being deposited on the perimeter edge of the glass substrate, it should be understood that the paste may be applied to various locations on the surfaces of the glass substrate or even on the edges of the glass substrate. Various techniques may be used to apply the paste to the glass substrate including, without limitation, screen printing, extruding the paste through an applicator, or similar deposition techniques.

Thereafter, the glass substrate 100 and the deposited glass frit composition are heated in a furnace to sinter and fully vitrify the glass frit composition and bond the glass frit composition to the glass substrate. As noted hereinabove, the glass substrates are generally heated to a maximum temperature which is less than or equal to about 450° C. in order to minimize relaxation of the initial compressive stress $CS_i$ in the glass substrate such that after heating, the glass substrate has a fired compressive stress $CS_f$ which is greater than or equal to $0.70 * CS_i$.

The glass substrate 100 with the applied glass frit composition may be heated in stages. For example, in one embodiment, the glass substrate 100 with the applied glass frit composition may be initially positioned in a first furnace which is heated to a first temperature T1 which is less than the sintering temperature $T_s$ of the glass frit composition. The glass substrate with the glass frit composition is held at this first temperature T1 for a first holding time HT1 to facilitate the burnout of any organic rheological aids in the glass frit composition. This first temperature T1 may be in a temperature range from about 300° C. to about 350° C. The first holding time HT1 may be in the range from about 10 minutes to about 120 minutes.

Thereafter, the glass substrate with the applied glass frit composition is positioned in a second furnace at a second temperature T2 to sinter the glass frit and bond the glass frit to the glass substrate. The second temperature T2 is greater than the first temperature T1 and less than or equal to 450° C. to mitigate relaxation of the compressive stress in the glass substrate. This second temperature generally corresponds to the sintering temperature $T_s$ of the glass frit. In the embodiments described herein the second temperature T2 is generally in the range from about 400° C. to about 450° C. The glass substrate is held at the second temperature T2 for a second holding time HT2 such that the glass frit is fully sintered and bonded to the glass substrate. In the embodiments described herein, the second holding time HT2 is generally from about 5 minutes to about 30 minutes.

Thereafter, the glass substrate with the sintered glass frit may be removed to a third furnace having an initial temperature less than T2 and greater than room temperature, such as, for example, about 380° C., and cooled to room temperature at a predetermined ramp rate. Alternatively, the glass substrate with the sintered glass frit may be cooled at ambient temperatures.

While the aforementioned heating schedule has been described as being performed in discrete furnaces, it should be understood that the heating schedule may be performed using a conveyor furnace in which the glass substrate with the applied glass frit composition is conveyed through discrete zones of the furnace on a conveyor system and each zone of the furnace is set at the desired temperature.

In another embodiment, the glass substrate with the applied glass frit composition may be heated in stages in a single furnace. For example, the glass substrate with the applied glass frit may be positioned in a furnace and heated from room temperature to a first temperature T1 at a first ramp rate R1. The first temperature T1 is less than the sintering temperature $T_s$ of the glass frit composition. In the embodiments described herein, the first temperature T1 may be in a temperature range from about 300° C. to about 350° C. The first ramp rate R1 may be from about 2° C./minute to about 10° C./minute. The glass substrate and the applied glass frit may be held at the first temperature T1 for a first holding time HT1 to facilitate the burnout of any organic rheological aids in the glass frit composition. The first holding time HT1 may be in the range from about 10 minutes to about 120 minutes.

Thereafter, the glass substrate with the applied glass frit may be heated from the first temperature T1 to a second temperature T2 at a second ramp rate R2. The second temperature T2 is greater than the first temperature T1 and less than or equal to 450° C. to mitigate relaxation of the compressive stress in the glass substrate. This second temperature generally corresponds to the sintering temperature $T_s$ of the glass frit. In the embodiments described herein the second temperature T2 is generally in the range from about 400° C. to about 450° C. The second ramp rate R2 may be from about 2° C./minute to about 20° C./minute. The glass substrate and the applied glass frit may be held at the second temperature T2 for a second holding time HT2 such that the glass frit is fully sintered and bonded to the glass substrate. In the embodiments described herein, the second holding time HT2 is generally from about 10 minutes to about 30 minutes.

Thereafter, the glass substrate with the sintered glass frit may be cooled to room temperature at a predetermined ramp rate or, alternatively, at ambient temperatures.

EXAMPLES

Embodiments of the strengthened glass substrates with glass frits and methods for forming the same will be further clarified with the following examples.

Example 1

Figure 3:
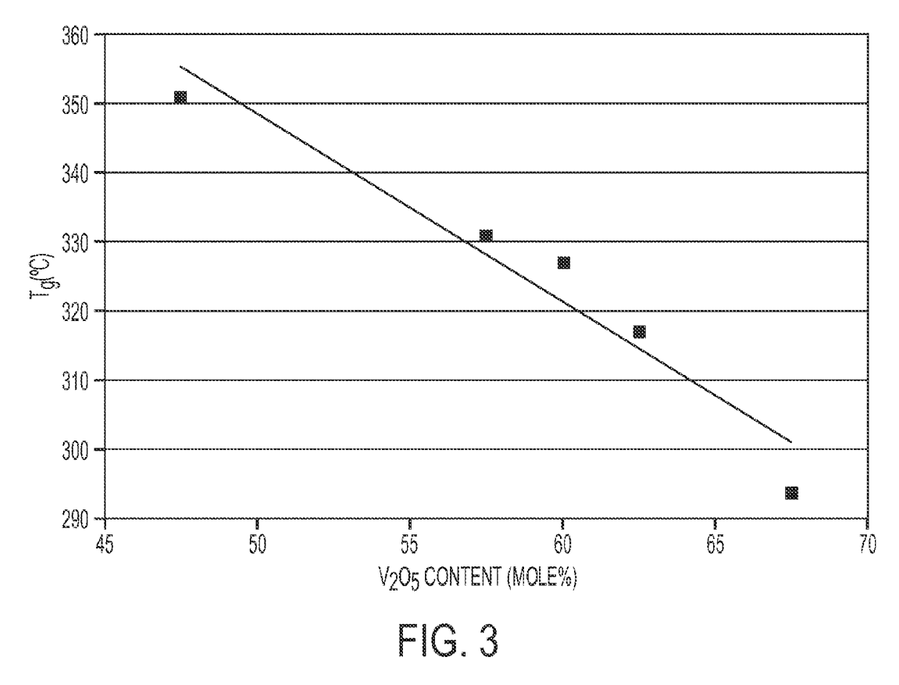
FIG. 3 graphically depicts the glass transition temperature (y-axis) as a function of the concentration of $V_2O_5$ (x-axis) for substitutions of $V_2O_5$ for $Sb_2O_3$ in an exemplary glass frit composition.

Five exemplary Sb—V-phosphate glass frit compositions (samples A-E) were prepared with differing concentrations of $Sb_2O_3$ and $V_2O_5$ to assess the impact of substituting $V_2O_5$ for $Sb_2O_3$ on the glass transition temperature of the glass frit composition. The composition of each sample is listed below in Table 1. Each sample was fired at 400° C. and the glass transition temperature was measured by differential scanning calorimetry. The measured glass transition temperature of each sample is reported in Table 1 and the results are plotted in FIG. 3 as a function of the concentration of $V_2O_5$. As shown in FIG. 3, the glass transition temperature of the glass frit compositions generally decreased as $V_2O_5$ was substituted for $Sb_2O_3$ in the glass frit compositions.

TABLE 1

| (Mol %) | A | B | C | D | E |
|---|---|---|---|---|---|
| $Sb_2O_3$ | 23.5 | 13.5 | 11.0 | 8.5 | 3.0 |
| $V_2O_5$ | 47.5 | 57.5 | 60.0 | 62.5 | 67.5 |
| $P_2O_5$ | 27.0 | 27.0 | 27.0 | 27.0 | 27.0 |
| $TiO_2$ | 1.0 | 1.0 | 1.0 | 1.0 | 1.0 |
| $Al_2O_3$ | 1.0 | 1.0 | 1.0 | 1.0 | 1.0 |
| $Fe_2O_3$ | 2.5 | 2.5 | 2.5 | 2.5 | 2.5 |
| $T_g$ | 351° | 331° | 327° | 317° | 294° |

Example 2

A glass frit composition was applied to the surface of four sample glass substrates. The glass substrates were formed from Corning glass code 2318 ion exchangeable glass. The four glass substrates had an average initial compressive stress $CS_i$ of 754 MPa and a depth of layer of 39 microns. The glass frit composition included 60 mol. % SnO, 32 mol. % $P_2O_5$, 6 mol. % ZnO, and 2 mol. % $B_2O_3$. The glass substrate and applied glass frit composition were positioned in a furnace at 325° C. and held for 20 minutes to facilitate binder burnout. Thereafter, the glass substrates were moved to a 425° C. furnace and held for 20 minutes to sinter the glass frit composition. The glass substrates were then removed to a room temperature furnace for cooling.

After cooling, the fit had a grey, matte to semi-gloss appearance. The fired compressive stress $CS_f$ and depth of layer DOL were measured. The fours glass substrates had an average fired compressive stress of 608 MPa and a DOL of 42 microns. Based on these measurements, the glass substrates had a 19.4% reduction in compressive stress after firing. Accordingly, the fired compressive stress $CS_f$ was greater than 80% of the initial compressive stress $CS_i$.

Example 3

A glass frit composition was applied to the surface of four sample glass substrates. The glass substrates were formed from Corning glass code 2318 ion exchangeable glass. The four glass substrates had an average initial compressive stress $CS_i$ of 757 MPa and a depth of layer of 39 microns. The glass frit composition included 60 mol. % SnO, 32 mol. % $P_2O_5$, 6 mol. % ZnO, and 2 mol. % $B_2O_3$. The glass substrate and glass frit composition were positioned in a furnace and heated to 250° C. at a ramp rate of 40° C./min and held for 30 minutes to facilitate binder burnout. Thereafter, the temperature of the furnace was increased to 450° C. at a ramp rate of 25° C./min and held for 20 minutes to sinter the glass frit composition. The glass substrates were then moved to a room temperature furnace for cooling.

After cooling, the frit had a grey, glossy appearance. The fired compressive stress $CS_f$ and depth of layer DOL were measured. The four glass substrates had an average fired compressive stress $CS_f$ of 542 MPa and a DOL of 45 microns. Based on these measurements, the glass substrates had a 28.4% reduction in compressive stress after firing. Accordingly, the fired compressive stress $CS_f$ was greater than 70% of the initial compressive stress $CS_i$.

Example 4

A glass frit composition was applied to the surface of 28 sample glass substrates. The glass substrates were formed from Corning glass code 2318 ion exchangeable glass. The glass substrates had an average initial compressive stress $CS_i$ of 647 MPa and a depth of layer of 39 microns. The glass frit composition included 47.5 mol. % $V_2O_5$, 23.5 mol. % $P_2O_5$, 27 mol. % $Sb_2O_3$, 1 mol. % $Al_2O_3$, 1 mol. % $TiO_2$, and 2.5 mol. % $Fe_2O_3$. The glass substrates and applied glass frit compositions were positioned in a furnace at 325° C. and held for 20 minutes to facilitate binder burnout. Thereafter, the glass substrates were moved to a 400° C. furnace and held for 10 minutes to sinter the glass frit composition. The glass substrates were then removed to a furnace heated to 380° C. and cooled to room temperature.

After cooling, the glass frit had a glossy black appearance. The fired compressive stress $CS_f$ and depth of layer DOL were measured. The 28 glass substrates had an average fired compressive stress of 571 MPa and a DOL of 41 microns. Based on these measurements, the glass substrates had an 11.7% reduction in compressive stress after firing. Accordingly, the fired compressive stress $CS_f$ was greater than 88% of the initial compressive stress $CS_i$.

Example 5

A glass frit composition was applied to the surface of 22 sample glass substrates. The glass substrates were formed from Corning glass code 2318 ion exchangeable glass. The glass substrates had an average initial compressive stress $CS_i$ of 733 MPa and a depth of layer of 40 microns. The glass frit composition included 47.5 mol. % $V_2O_5$, 23.5 mol. % $P_2O_5$, 27 mol. % $Sb_2O_3$, 1 mol. % $Al_2O_3$, 1 mol. % $TiO_2$, and 2.5 mol. % $Fe_2O_3$. The glass substrates and applied glass frit composition were positioned in a furnace and heated to 325° C. at a ramp rate of 5° C./min and held for 20 minutes to facilitate binder burnout. Thereafter, the temperature of the furnace was increased to a 400° C. at a ramp rate of 5° C./min and held for 15 minutes to sinter the glass frit composition. The glass substrates were then cooled to room temperature at a rate of 5° C./min.

After cooling, the glass frit had a glossy black appearance. The fired compressive stress $CS_f$ and depth of layer DOL were measured. The 22 glass substrates had an average fired compressive stress of 612 MPa and a DOL of 42 microns. Based on these measurements, the glass substrates had a 15.3% reduction in compressive stress after firing. Accordingly, the fired compressive stress $CS_f$ was greater than 84% of the initial compressive stress $CS_i$.

Based on the foregoing, it should now be understood that the methods described herein may be used to produce strengthened glass substrates with applied glass frits without a significant decrease in the compressive stress imparted to the glass substrate by ion exchange. It should also be understood that this benefit is facilitated by applying glass frit compositions having relatively low glass transition temperatures and relatively low softening points to the strengthened glass substrate. Glass frit compositions with these characteristics may be fully sintered at relatively low temperatures thereby mitigating the loss of compressive stress due to stress relaxation.

The strengthened glass articles with applied glass frits described herein may be used in a variety of different applications including, without limitation, cover panels for electronic devices, automotive glazing, and the like.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for forming a glass frit on a glass substrate, the method comprising:

providing a glass substrate comprising a compressive stress layer extending from a surface of the glass substrate into a thickness of the glass substrate, the compressive stress layer having a depth of layer DOL and an initial compressive stress $CS_i$, wherein the glass substrate is an ion-exchanged glass substrate comprising aluminosilicate or alkali borosilicate glass;

depositing a lead free glass frit composition on at least a portion of the surface of the glass substrate to form a glass assembly;

heating the entire glass assembly in a furnace to sinter the lead free glass frit composition and bond the lead free glass frit composition to the glass substrate, wherein, after heating, the lead free glass frit composition is fully vitrified and the glass substrate has a fired compressive stress $CS_f$ which is greater than or equal to $0.70*CS_i$, wherein the entire glass assembly is heated by:

heating the glass assembly to a first temperature T1;

holding the glass assembly at the first temperature T1 for a first holding time HT1;

heating the glass assembly to a second temperature T2; and holding the glass assembly at the second temperature T2 for a second holding time HT2, wherein the second temperature T2 is less than or equal to about 450° C. and the first temperature T1 is less than or equal to the second temperature T2.

2. The method of claim 1, wherein:

the glass assembly is heated from room temperature to the first temperature T1 at a first ramp rate R1; and the glass assembly is heated from the first temperature T1 to the second temperature T2 at a second ramp rate R2.

3. The method of claim 1, wherein the initial compressive stress $CS_i$ is greater than or equal to about 600 MPa and the depth of layer DOL is greater than or equal to about 30 μm.

4. The method of claim 1, wherein the lead free glass frit composition has a softening point which is less than or equal to 400° C.

5. The method of claim 1, wherein the lead free glass frit composition has a glass transition temperature which is less than or equal to 375° C.

6. The method of claim 1, wherein the glass substrate has a substrate coefficient of thermal expansion $CTE_s$, the lead free glass frit composition has a frit coefficient of thermal expansion $CTE_F$, and the frit coefficient of thermal expansion $CTE_F$ is within $+/-10 \times 10^{-7}/°$ C. of the substrate coefficient of thermal expansion $CTE_s$.

7. The method of claim 1, wherein the substrate coefficient of thermal expansion $CTE_s$ is in a range from about $80 \times 10^{-7}/°$ C. to about $95 \times 10^{-7}/°$ C. over a temperature range from 0° C. to 300° C.

8. The method of claim 1, wherein the lead free glass frit composition comprises:
from about 50 mol. % to about 75 mol. % SnO;
from about 28 mol. % to about 35 mol. % $P_2O_5$;
from about 2 mol. % to about 10 mol. % ZnO; and
from about 1 mol. % to about 5 mol. % $B_2O_3$.

9. The method of claim 1, wherein the lead free glass frit composition comprises:
from about 40 mol. % to about 60 mol. % $V_2O_5$;
from about 15 mol. % to about 30 mol. % $P_2O_5$;
from about 20 mol. % to about 35 mol. % $Sb_2O_3$;
from about 0 mol. % to about 2 mol. % $AlO_3$;
from about 0 mol. % to about 5 mol. % $Fe_2O_3$; and
from about 0 mol. % to about 2 mol. % $TiO_2$.

10. The method of claim 1, wherein the lead free glass frit composition comprises:
from about 30 mol. % to about 50 mol. % $V_2O_5$;
from about 10 mol. % to about 30 mol. % $P_2O_5$;
from about 0 mol. % to about 10 mol. % ZnO;
from about 10 mol. % to about 30 mol. % $Fe_2O_3$; and
from about 10 mol. % to about 30 mol. % $TiO_2$; and
the glass frit composition is free from antimony and compounds containing antimony.

11. The method of claim 1, wherein the lead free glass frit composition comprises:
from about 50 mol. % to about 60 mol. % $V_2O_5$;
from about 25 mol. % to about 30 mol. % $P_2O_5$;
from about 10 mol. % to about 20 mol. % $Sb_2O_3$;
from about 0 mol. % to about 2 mol. % $AlO_3$;
from about 0 mol. % to about 2.5 mol. % $Fe_2O_3$; and
from about 0 mol. % to about 2 mol. % $TiO_2$.

12. The method of claim 1, wherein the second temperature T2 ranges from 400° C. to 500° C. and the second hold time HT2 ranges from 5 to 30 minutes.

13. A method for forming a glass frit on a glass substrate, the method comprising:
providing a glass substrate comprising a compressive stress layer extending from a surface of the glass substrate into a thickness of the glass substrate, the compressive stress layer having a depth of layer DOL and an initial compressive stress $CS_i$, wherein the glass substrate is an ion-exchanged glass substrate comprising aluminosilicate or alkali borosilicate glass;
depositing a lead free glass frit composition on at least a portion of the surface of the glass substrate to form a glass assembly, the lead free glass frit composition having a softening point which is less than or equal to 400° C.; and
heating the entire glass assembly in a furnace to a temperature less than or equal to 450° C. such that, after heating, the lead free glass frit composition is fully vitrified and sintered and bonded to the glass substrate,
wherein the entire glass assembly is heated by:
heating the glass assembly to a first temperature T1;
holding the glass assembly at the first temperature T1 for a first holding time HT1;
heating the glass assembly to a second temperature T2; and
holding the glass assembly at the second temperature T2 for a second holding time HT2, wherein the second temperature T2 is less than or equal to about 450° C. and the first temperature T1 is less than or equal to the second temperature T2.

14. The method of claim 13, wherein the lead free glass frit composition has a glass transition temperature which is less than or equal to 375° C.

15. The method of claim 13, wherein the glass substrate has a substrate coefficient of thermal expansion CTEs, the lead free glass frit composition has a frit coefficient of thermal expansion $CTE_F$, and the frit coefficient of thermal expansion $CTE_F$ is within $+/-10 \times 10^{-7}/°$ C. of the substrate coefficient of thermal expansion $CTE_s$.

16. The method of claim 13, wherein the substrate coefficient of thermal expansion CTE is in a range from about $80 \times 10^{-7}/°$ C. to about $95 \times 10^{-7}/°$ C. over a temperature range from 0° C. to 300° C.

17. The method of claim 13, wherein the second temperature T2 ranges from 400° C. to 500° C. and the second hold time HT2 ranges from 5 to 30 minutes.

* * * * *